United States Patent
Yamazaki

(10) Patent No.: US 7,373,478 B2
(45) Date of Patent: May 13, 2008

(54) INFORMATION PROCESSING APPARATUS AND SOFTWARE PRE-FETCH CONTROL METHOD

(75) Inventor: Iwao Yamazaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 455 days.

(21) Appl. No.: 10/986,017

(22) Filed: Nov. 12, 2004

(65) Prior Publication Data
US 2006/0026365 A1    Feb. 2, 2006

(30) Foreign Application Priority Data
Jul. 30, 2004    (JP)    ............... 2004-224560

(51) Int. Cl.
*G06F 12/10* (2006.01)
(52) U.S. Cl. ............... 711/205; 711/137; 711/213
(58) Field of Classification Search ............... None
See application file for complete search history.

(56) References Cited

U.S. PATENT DOCUMENTS

| | | | |
|---|---|---|---|
| 5,265,220 A | 11/1993 | Kinoshita | |
| 5,423,014 A | 6/1995 | Hinton et al. | |
| 5,790,979 A | 8/1998 | Liedtke | |
| 5,970,509 A | 10/1999 | Green | |
| 6,363,336 B1 | 3/2002 | Banning et al. | |
| 6,418,521 B1* | 7/2002 | Mathews et al. | 711/207 |
| 6,473,836 B1 | 10/2002 | Ikeda | 711/137 |
| 6,490,658 B1 | 12/2002 | Ahmed et al. | |
| 6,553,477 B1* | 4/2003 | Krishna et al. | 711/207 |
| 6,711,671 B1 | 3/2004 | Undy et al. | |
| 6,745,293 B2* | 6/2004 | Lasserre et al. | 711/131 |
| 6,832,296 B2* | 12/2004 | Hooker | 711/137 |
| 2003/0135845 A1 | 7/2003 | Nunomura | |

FOREIGN PATENT DOCUMENTS

EP    0 318 702    6/1989
JP    2000-339157    12/2000

OTHER PUBLICATIONS

European Search Report, mailed Dec. 19, 2007 and issued in corresponding European Patent Application No. 04257428.5-1243.

* cited by examiner

*Primary Examiner*—Gary J Portka
(74) *Attorney, Agent, or Firm*—Staas & Halsey LLP

(57) ABSTRACT

In an information processing apparatus (10) that includes a cache memory (560) formed from at least one hierarchy, and a pre-fetch command that speculatively transfers data or a command from a main storage (30) to the cache memory, a cache controller (510) provides control to execute the pre-fetch command such that a virtual address is converted to a physical address using a conversion table, and the virtual address and the physical address are stored as a pair if the conversion succeeds.

6 Claims, 6 Drawing Sheets

SOFTWARE PIPELINING

INFORMATION PROCESSING APPARATUS AND SOFTWARE PRE-FETCH CONTROL METHOD

BACKGROUND OF THE INVENTION

1) Field of the Invention

The present invention relates to an information processing apparatus and a software pre-fetch control method that can effectively pre-fetch commands if a translation look-aside buffer (TLB) formed from plural hierarchies exists.

2) Description of the Related Art

In recent years, performance of information processing apparatuses has been improving remarkably, and the number of commands that can be executed per unit time is increasing considerably, year after year. In contrast, the speed of accessing main storages are not improving that much, and there is the problem that a long processing wait time arises when the information processing apparatus fetches or stores data in the main storage.

To overcome this problem, a technique is widely being employed in which a cache memory, having smaller capacity but larger access speed than the main storage, is provided between the information processing apparatus and the main storage. In accessing the main storage, localization is recognized, and regions of the main storage that are accessed frequently are held in the cache memory. Consequently, the wait time during data access is minimum.

A pre-fetching technique also is used often to utilize the cache even more effectively. When data that does not exist in the cache is needed, that data must be transferred from the main storage to the cache. However, because accessing the main storage is slow, a processing wait occurs until the transfer is complete. Thus, pre-fetching is enabling the information processing apparatus to use data on the cache without generating a processing wait, by predicting in advance which data will be needed, and transferring the predicted data from the main storage to the cache in advance.

Japanese Patent Application Laid-open No. 2000-339157 Publication discloses a cache memory control apparatus and a computer system, which have plural types of pre-fetching commands, and which utilize these commands properly depending on the situation, to thereby carry out pre-fetching effectively while keeping the burden on the system to a minimum.

However, there are cases when pre-fetching cannot be executed effectively, even if the technique disclosed in Japanese Patent Application Laid-open No. 2000-339157 Publication is used. The problem lies in the conversion from a virtual address to a physical address.

Currently, virtual memories, which provide a virtual address space that is larger than the actual capacity of the main storage, are widely used in many systems. However, in such systems, the virtual address on the virtual address space must be converted to the physical address on the main storage when the main storage is accessed. The address conversion is also necessary at the time of executing software pre-fetching that is one type of pre-fetching.

When the virtual address is converted to the physical address, a conversion table, called a TLB, which is stored in a memory, must be referred to. Current TLBs are made to have many hierarchies in order to be higher-speed. When the hierarchy cannot be utilized efficiently, there are cases that the pre-fetching command breaks down and the software pre-fetching fails.

SUMMARY OF THE INVENTION

It is an object of the invention to at least solve the problems in the conventional technology.

An information processing apparatus according to an aspect of the present invention includes a cache memory formed from at least one hierarchy; a pre-fetch command that speculatively transfers data or a command from a main storage to the cache memory; a first address-converting unit that converts a virtual address to a physical address, includes a first conversion table of the virtual addresses and the physical addresses, and is used first for address conversion; a second address-converting unit that converts the virtual address not converted by the first address-converting unit, and that includes a second conversion table of the virtual addresses and the physical addresses; and a cache controller that, when the pre-fetch command is run, provides control to execute the pre-fetch command, wherein the execution includes using the first address-converting unit to convert the virtual address, using the second address-converting unit to convert the virtual address if the first address-converting unit can not convert the virtual address, registering the virtual address and the physical address as a pair in the first address-converting unit if the conversion succeeds, and ending the pre-fetch command.

A method according to another aspect of the present invention is a method for software pre-fetch control in an information processing apparatus that includes a cache memory formed from at least one hierarchy, and a pre-fetch command that speculatively transfers data or a command from a main storage to the cache memory. The method includes a first converting including converting a virtual address to a physical address, using a first conversion table of the virtual addresses and the physical addresses; a second converting including converting the virtual address using a second conversion table of the virtual addresses and the physical addresses, if the virtual address can not be converted at the first converting; executing the pre-fetch command including performing the first converting, performing the second converting if the first converting fails, registering the virtual address and the physical address as a pair if the virtual address can be converted, and ending the pre-fetch command.

The other objects, features, and advantages of the present invention are specifically set forth in or will become apparent from the following detailed description of the invention when read in conjunction with the accompanying drawings.

DETAILED DESCRIPTION

Exemplary embodiments of an information processing apparatus and a software pre-fetch control method according to the present invention will be explained below with reference to the accompanying drawings.

The embodiment has been explained using a SPARC® architecture information processing apparatus as an example. However, the present invention is not limited to application to an information processing apparatus of a specific architecture, and can be applied to information processing apparatuses of various architectures. For convenience of explanation, a portion of the specifications of the SPARC® architecture have been simplified or omitted in the descriptions and illustrations that follow.

Figure 1:
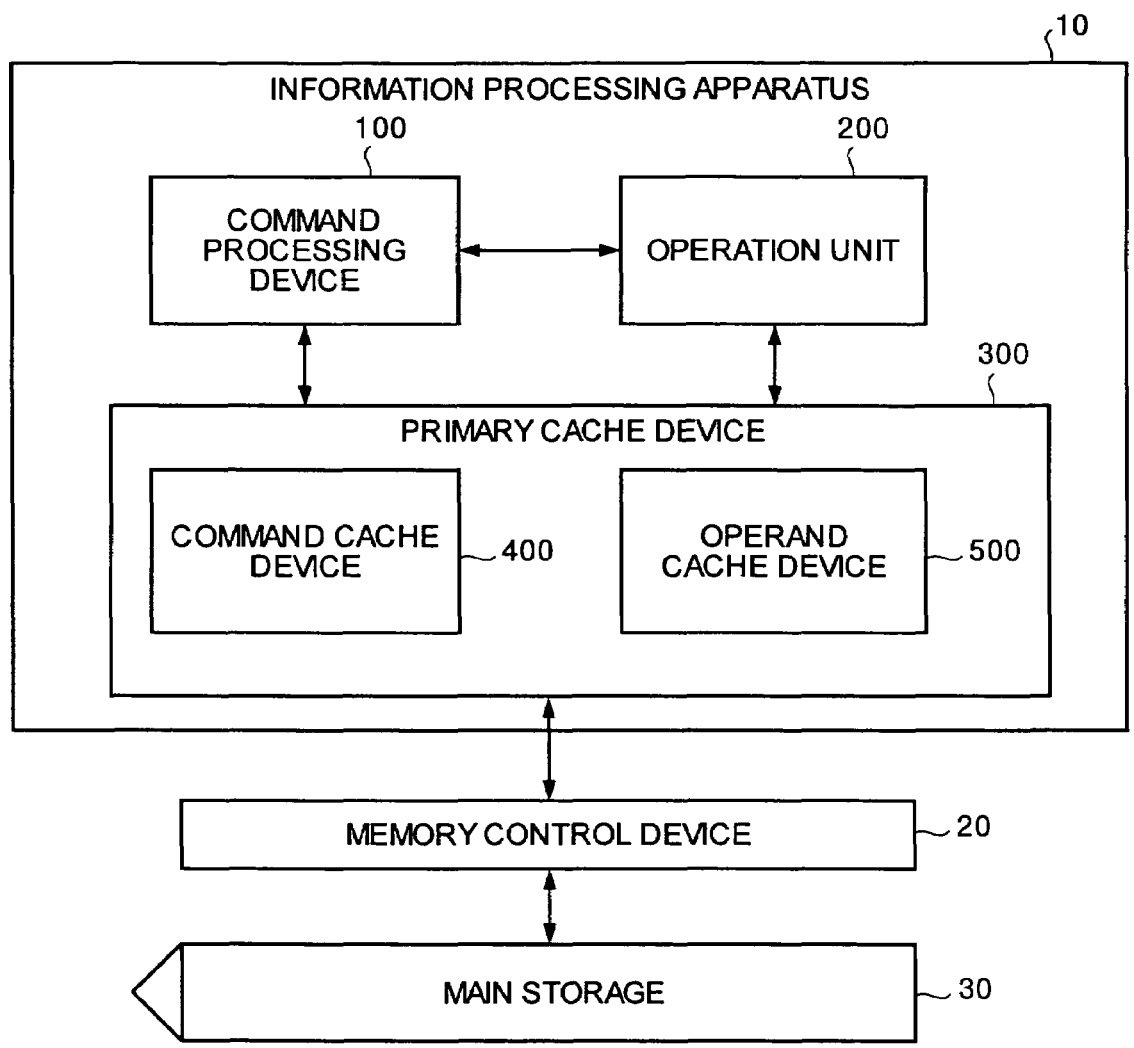
FIG. 1 is a block diagram of an overall structure of an information processing apparatus according to the present embodiment.

First, a structure of an information processing apparatus according to the present embodiment will be described with reference to FIG. 1. An information processing apparatus 10 is connected to a main storage 30 via a memory control device 20.

On the basis of requests from the information processing apparatus 10, the memory control device 20 controls fetching of data and commands from the main storage 30, and storing of data in the main storage 30. The main storage 30 is a storage unit where, commands and data that the information processing apparatus 10 uses, are expanded.

The information processing apparatus 10 includes a command processing device 100, an operation unit 200, and a primary cache device 300. The command processing device 100 reads a command of a program expanded in the main storage 30, and executes the program in the operation unit 200 or the like. The operation unit 200 carries out various types of computation based on instructions from the command processing device 100.

The primary cache device 300 speeds up the exchange of commands and data between the information processing apparatus 10 and the main storage 30, by storing therein, a portion of the main storage 30, and includes a command cache device 400, and an operand cache device 500. The command cache device 400 stores commands stored in the main storage 30, and the operand cache device 500 mainly stores data stored in the main storage 30.

In the present embodiment, to simplify explanation, the information processing apparatus 10 with a single-hierarchy cache system formed from only the primary cache device 300, is described. However, the information processing apparatus 10 may be provided with a multi-hierarchy cache system having a secondary cache and a tertiary cache.

The role of the primary cache device 300 is described next. A semiconductor used in the main storage 30 stresses on storage capacity, whereas the information processing apparatus 10 stresses on the processing speed only. Therefore, the progress of semiconductor techniques does not focus only on improving the operation speed. Thus, the difference in the operation speeds of the information processing apparatus 10 and the main storage 30 has become larger year-by-year, and currently, the difference is remarkably large.

As a solution to the above problem a cache memory 560 is provided in the primary cache device 300, and is structured so as to stress on operation speed more than on storage capacity. Therefore, the command processing device 100 and the operation unit 200 can access the cache memory 560 at a far higher speed, as compared with a case of accessing the main storage 30.

The capacity of the cache memory 560 in the primary cache device 300 is small as compared with the capacity of the main storage 30. However, it is known that access to the main storage 30 is generally localized, and by merely storing in the cache memory 560, only those regions of the main storage 30 that are accessed frequently, the accessing of the main storage 30 remarkably decreases, and the performance of the system greatly improves.

The information processing apparatus 10 has a pre-fetch mechanism to effectively utilize the cache memory 560 of the primary cache device 300. Pre-fetching is a mechanism in which data or the like that the command processing device 100 or the operation unit 200 needs, is predicted in advance, and is moved from the main storage 30 to the primary cache device 300.

If data or the like that is needed does not exist in the primary cache device 300, the command processing device 100 or the operation unit 200 must acquire that data or the like from the low-speed main storage 30, and a large processing delay arises. If the needed data or the like is moved in advance to the primary cache device 300 by pre-fetching, the delay can be avoided, leading to an improvement in the performance of the system.

In pre-fetching, other than hardware pre-fetching that the information processing apparatus 10 itself determines and executes, there exists software pre-fetching based on a software pre-fetch command generated at the time when a compiler compiles source codes. In the SPARC® architecture, the software pre-fetching commands are divided into two types of pre-fetching commands, namely, strong pre-fetch commands and weak pre-fetching commands.

Figure 2:
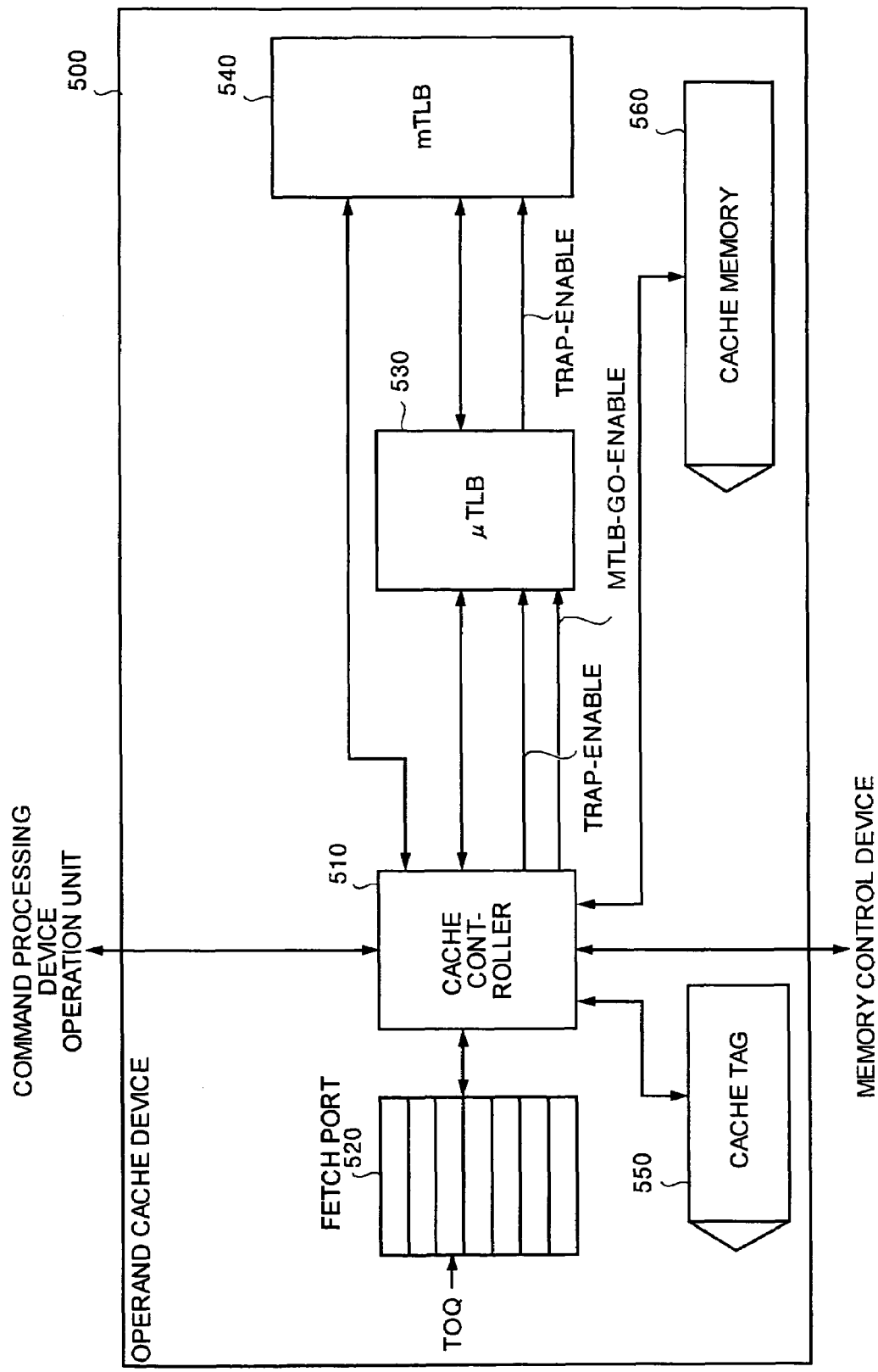
FIG. 2 is a block diagram of a structure of an operand cache device shown in FIG. 1.

Before these two pre-fetching commands are described, the structure of the operand cache device 500, which is needed as prerequisite knowledge thereto, will be described next. FIG. 2 is a block diagram of the structure of the operand cache device 500 shown in FIG. 1.

The operand cache device 500 includes a cache controller 510, a fetch port 520, a μTLB 530, an mTLB 540, a cache tag 550, and a cache memory 560. FIG. 2 depicts only those devices that are related to fetching of data, and does not depict all of the devices that are included in the operand cache device 500.

The cache controller 510 controls the operand cache device 500 as a whole, and controls exchange of requests and responses with external devices such as the command processing device 100, the operation unit 200, and the memory control device 20, and sending various types of instructions to other devices within the operand cache device 500.

The fetch port 520 is a storage unit that, for each command, assigns a port and stores information such as the state of execution or the like of a fetching command or a pre-fetching command being executed. Information is stored in the respective ports in accordance with the order of execution of the commands, and the port with information relating to the oldest command is designated by TOQ (Top of Queue).

When the fetching command or the pre-fetching command is completed, a command execution completion flag is set at that port. The TOQ port, at which the command execution completion flag is set, is then subjected to completion processing, and is released at the time when the cycle finishes. At this time, completion flags are set at subsequent ports as well. During that time, if there is no port at which a completion flag is not set, up to the largest three ports, including the TOQ port, are subjected to completion processing, and are released. The released ports can be reused for new fetching commands or pre-fetching commands, and the TOQ designates the port that has then become the oldest.

The μTLB 530 and the mTLB 540 both store conversion tables for converting virtual addresses to physical addresses. Conventionally, a conversion table for address conversion is managed by a single TLB, but systems have become multi-hierarchy in order to be able to address the conflicting demands for increased capacity and maintenance of conversion speed.

In recent years, the memory requirement of programs operating in the information processing apparatus has increased remarkably, and the capacity of the TLB that associates the virtual addresses and the physical addresses has also increased accordingly. However, when the capacity of the TLB increases, the time required to search for the required TLB entry also increases. Because the conversion from the virtual address to the physical address is carried out frequently, the increase in the search time leads to deterioration in the performance of the system.

To overcome this problem, the TLB is structured in two hierarchies, namely, the μTLB 530 with small capacity and the mTLB 540 with large capacity. Usually, address conversion is carried out using the μTLB 530 whose capacity is small but using which searching is fast. Only if the required TLB entry is not in the μTLB 530, the mTLB 540 is accessed, the TLB entry is searched for, and if found, the TLB entry is transferred to the μTLB 530. Accessing the mTLB 540, which has large capacity but is slow, is thereby kept to a minimum, and the address conversion is carried out quickly.

While there are two hierarchies of the TLB here, the TLB may have a hierarchical structure of three hierarchies or more.

Next, two signals transmitted from the cache controller 510 to the μTLB 530 are explained. The first signal is a TRAP-ENABLE signal. The signal is sent to the mTLB 540 as well, and controls whether to generate a FAST-MMU-MISS-TRAP.

When the TRAP-ENABLE signal is turned on, if the required TLB entry does not exist in the mTLB 540, the FAST-MMU-MISS-TRAP is generated. This exception is notified to the OS, and, depending on the circumstances, the OS takes necessary measures. If the FAST-MMU-MISS-TRAP is generated as an attempt to access a region exceeding the range of the usable virtual memory, the OS stops the program that generated the exception.

When the TRAP-ENABLE signal is turned off, even if the required TLB entry does not exist in the mTLB 540, the FAST-MMU-MISS-TRAP is not generated.

The second signal is an MTLB-GO-ENABLE signal. The signal controls whether to access the mTLB 540, in a case that the required TLB entry is not found in the μTLB 530. When the MTLB-GO-ENABLE signal is turned off, the mTLB 540 is not accessed even if the required TLB entry is not found in the μTLB 530.

The cache tag 550 stores which region of the main storage 30 is stored in the cache memory 560. The cache memory 560 enables high speed access, and has a relatively small capacity. By holding a portion of the data or the like of the main storage 30, the cache memory 560 plays the role of absorbing the speed difference between the information processing apparatus 10 and the main storage 30.

The strong pre-fetching command, which is a software pre-fetching command, is described next. The strong pre-fetching command is a software pre-fetching command executed in a state in which both the TRAP-ENABLE signal and the MTLB-GO-ENABLE signal are on.

Accordingly, when a strong pre-fetching command is executed, if the required TLB entry is not in the μTLB 530 at the time of address conversion, the mTLB 540 is accessed. If the required TLB entry is not found in the mTLB 540, the FAST-MMU-MISS-TRAP is generated.

Figure 4:
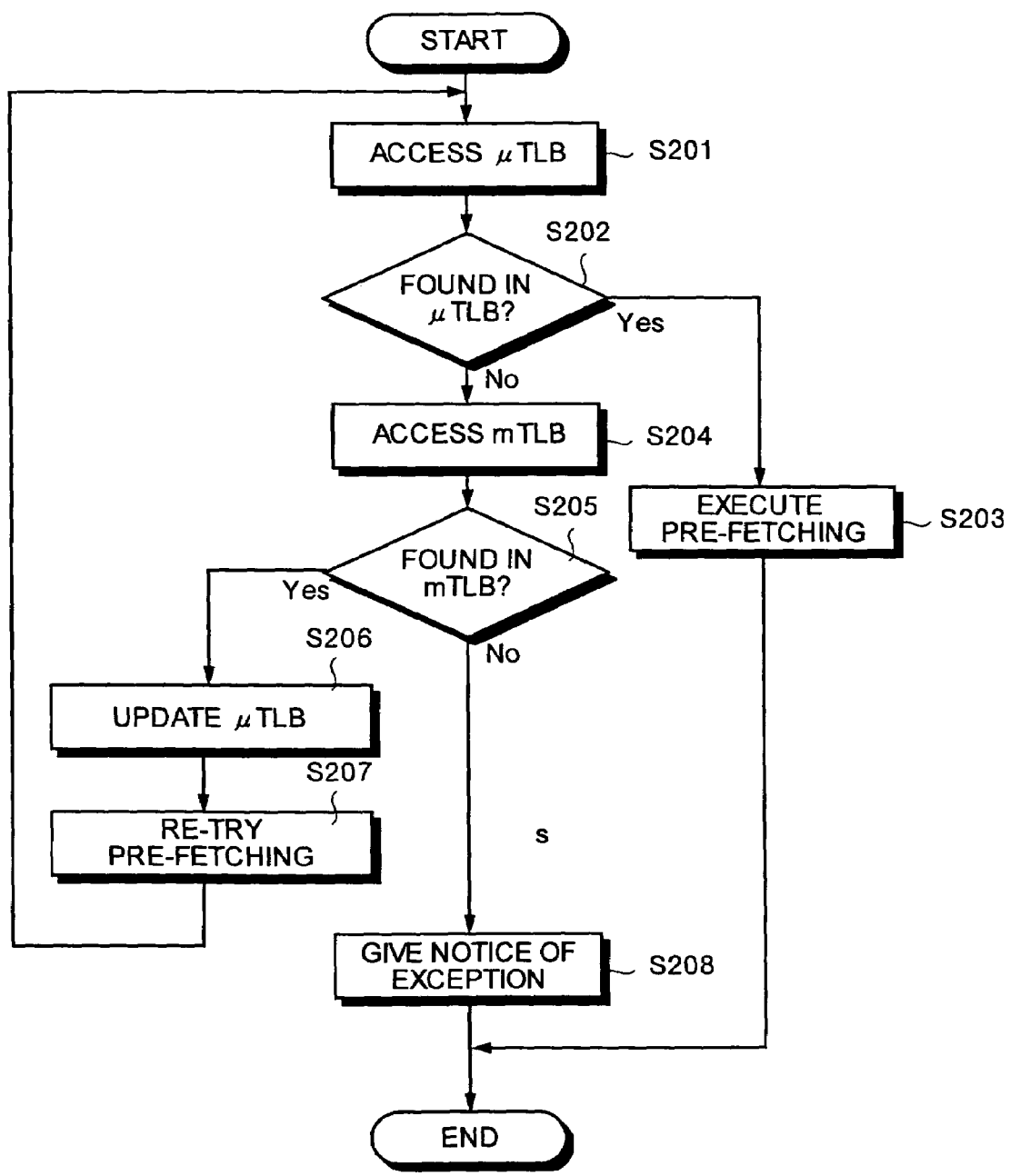
FIG. 4 is a flowchart of a process procedure of a strong pre-fetching command.

FIG. 4 is a flowchart of a process procedure of the strong pre-fetching command. First, the μTLB 530 is accessed (step S201) for the address conversion from the virtual address to the physical address. If the required TLB entry exists in the μTLB 530, and address conversion can be carried out (Yes at step S202), a pre-fetching process is executed (step S203).

Details of the pre-fetching process are as follows. First, the cache tag 550 is searched using the physical address obtained after the address conversion, and it is investigated whether a region that is an object of pre-fetching is stored in the cache memory 560. If the region that is the object of pre-fetching is stored in the cache memory 560, no particular process is carried out. Otherwise, that region is requested from the memory control device 20, and the acquired data is stored in the cache memory 560.

If the required TLB entry does not exist in the μTLB 530 (No at step S202), the mTLB 540 is accessed (step S204). If the required TLB entry does not exist in the mTLB 540 as well (No at step S205), the FAST-MMU-MISS-TRAP is generated, and the pre-fetching is cancelled (step S208).

If the required TLB entry does not exist in the mTLB 540, it is also possible to search for the required TLB entry by referring to the address conversion table in the main storage 30. However, searching the main storage 30 is a slow process, and therefore, the pre-fetching is likely to be delayed. Hence, when address conversion cannot be carried out using the TLBs, the execution of pre-fetching is cancelled.

When the required TLB entry exists in the mTLB 540 (Yes at step S205), that entry is written to the μTLB 530 (step S206), and the pre-fetching command is re-tried (step S207). By the re-try, the μTLB 530 is accessed again, but this time, the TLB entry that is written at step S206 is hit (Yes at step S202), and the pre-fetching process is executed (step S203).

Thus, in the strong pre-fetching command, if the entry for address conversion exists in either the μTLB 530 or the mTLB 540, the pre-fetching process is executed at a high frequency, without canceling the pre-fetching. However, due to the problem of compatibility with the optimizing technique of the compiler, the strong pre-fetching command is actually used less frequently.

Figure 5:
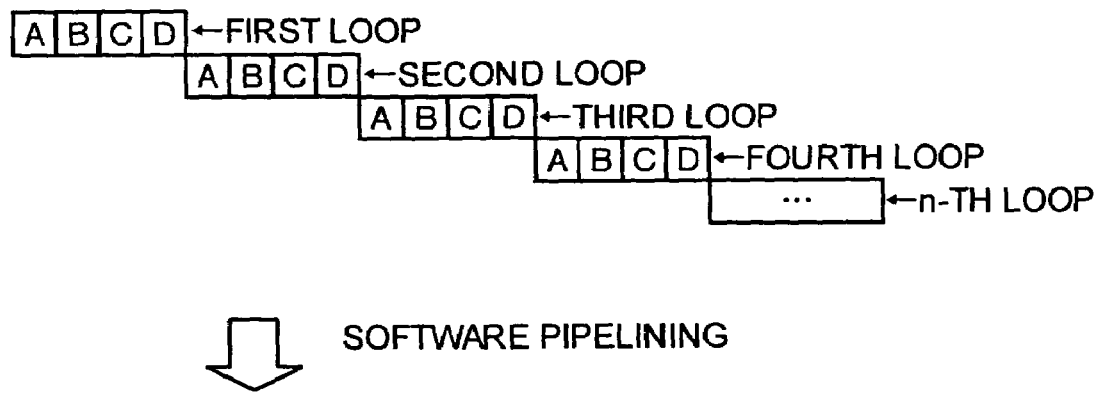
FIG. 5 is an explanatory diagram of an optimizing method based on software pipelining.
Figure 5:
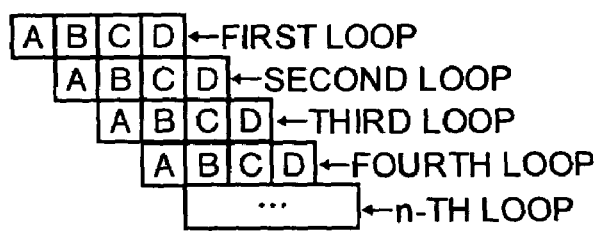

Specifically, one such case is when the compiler optimizes loop processing using a software pipelining technique. FIG. 5 is an explanatory diagram of an optimizing method based on software pipelining. In software pipelining, reconfiguring such that the commands in the loop can be executed in parallel shortens the cycle required until completion of the loop.

Software pipelining and pre-fetching are often used together, so that commands executed in parallel do not have to wait for data. However, sometimes when the loop is finished, pre-fetching is executed for regions that exceed the range of the data regions that the loop uses at that time. At this time, if the pre-fetching is in accordance with the strong pre-fetching command and the region that is accessed out-of-range is a region not being used, then the program is stopped by the generation of the FAST-MMU-MISS-TRAP.

The weak pre-fetching command, which is another software pre-fetching command, is described next. The weak pre-fetching command is a software pre-fetching command executed in a state in which both the TRAP-ENABLE signal and the MTLB-GO-ENABLE signal are off.

Accordingly, when the weak pre-fetching command is executed, if the required TLB entry is not in the μTLB 530 at the time of address conversion, the mTLB 540 is not accessed. The FAST-MMU-MISS-TRAP also is not generated.

Figure 6:
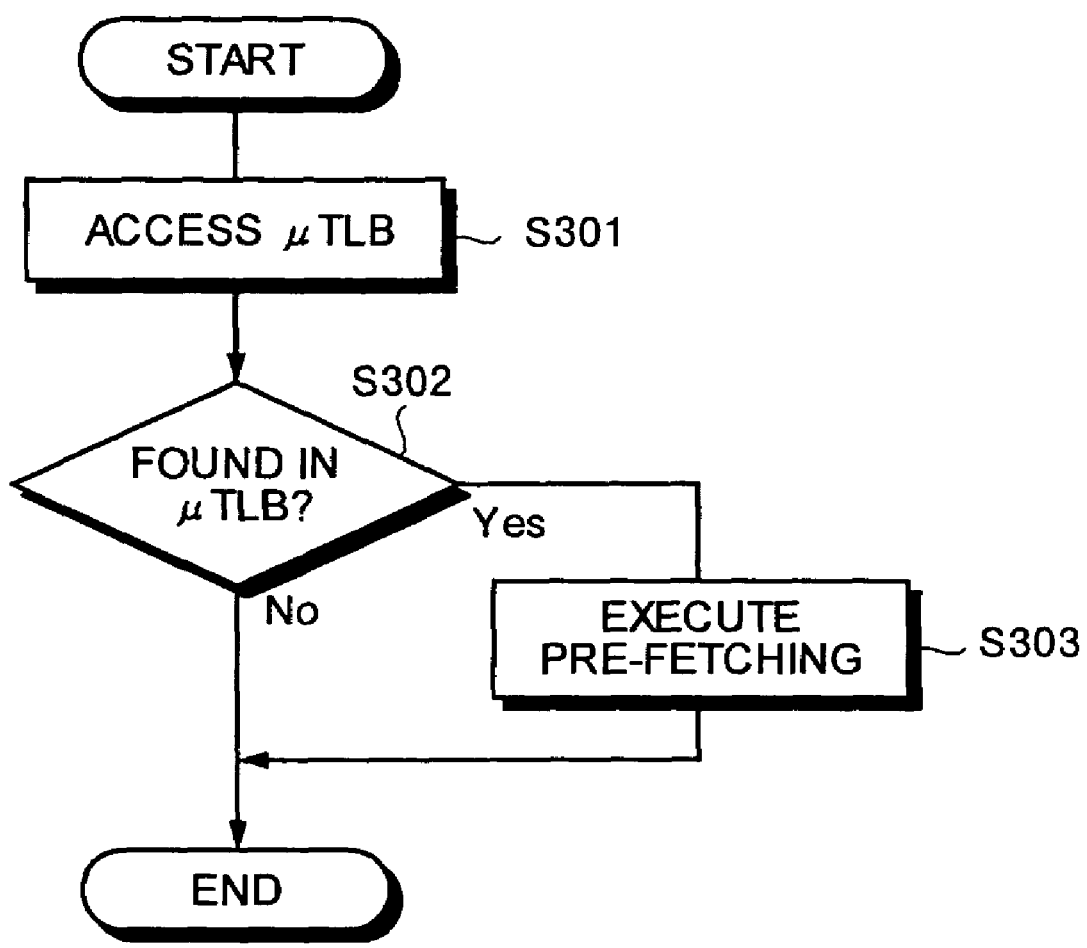
FIG. 6 is a flowchart of a process procedure of a weak pre-fetching command in a conventional software pre-fetching system.

FIG. 6 is a flowchart of a process procedure of the weak pre-fetching command in a conventional software pre-fetching system. First, the μTLB 530 is accessed to convert the virtual address to the physical address (step S301). If the required TLB entry exists in the μTLB 530, and the address conversion can be carried out (Yes at step S302), the pre-fetching process is executed (step S303).

If the required TLB entry does not exist in the μTLB 530 (No at step S302), the pre-fetching is cancelled and an exception is not generated.

Because the FAST-MMU-MISS-TRAP is not generated in the weak pre-fetching command, the problems such as those with the strong pre-fetching command do not exist. Therefore, when the software pre-fetching is carried out, in most cases, the weak pre-fetching command is used.

However, the weak pre-fetching command is cancelled if the entry for address conversion does not exist in the μTLB 530, and therefore, the frequency at which the pre-fetching processing is executed, is low. In the case of the weak pre-fetching command, even if the required entry exists in the mTLB 540, this cannot be used effectively.

In the software pre-fetching system according to the present embodiment, the operation of the weak pre-fetching command is improved, and the pre-fetching process is carried out at a high frequency by effectively utilizing the information in the mTLB 540. Specifically, when the weak pre-fetching command is executed, the mTLB 540 is accessed in the state in which only the MTLB-GO-ENABLE signal is turned on and generation of the FAST-MMU-MISS-TRAP is suppressed.

Figure 3:
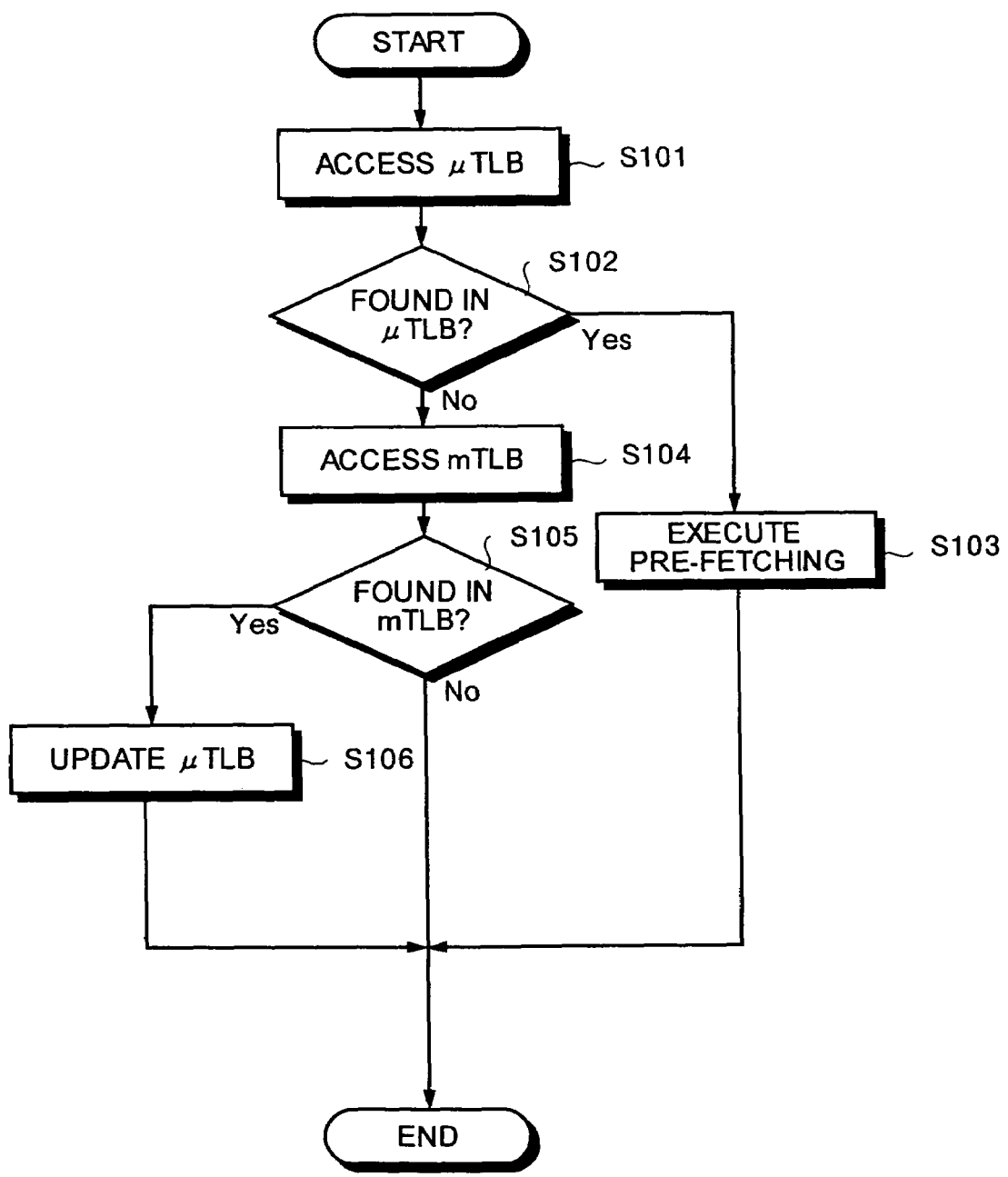
FIG. 3 is a flowchart of a process procedure of a weak pre-fetching command in a software pre-fetching system.

FIG. 3 is a flowchart of a process procedure of the weak pre-fetching command in the software pre-fetching system according to the present embodiment. First, the μTLB 530 is accessed to convert the virtual address to the physical address (step S101). If the required TLB entry exists in the μTLB 530 and address conversion can be carried out (Yes at step S102), pre-fetching process is executed (step S103).

If the required TLB entry does not exist in the μTLB 530 (No at step S102), the pre-fetching is cancelled, and the mTLB 540 is accessed (step S104).

If the required TLB entry does not exist in the mTLB 540 as well (No at step S105), the FAST-MMU-MISS-TRAP is not generated. If the required TLB entry exists in the mTLB 540 (Yes at step S105), the entry is written to the μTLB 530 (step S106).

If the required entry does not exist in the μTLB 530, the weak pre-fetching command in the software pre-fetching system according to the present embodiment cancels the pre-fetching at that point in time, and refers to the mTLB 540. If the entry required for address conversion is found in the mTLB 540, that entry is written to the μTLB 530. The reasons why a re-try of the command is not carried out after writing to the μTLB 530 as in the strong pre-fetching command, are as follows.

The first reason is that, to re-try the command, the complex control of prohibiting access to the mTLB 540 and executing a trap notifying flow, and simultaneously, inhibiting the trap notification itself, must be added to the weak pre-fetching command, and a large number of steps are required for design and inspection.

The second reason is that, even if the pre-fetching process is not executed by the first weak pre-fetching command, the μTLB 530 is updated, and therefore, pre-fetching process of the same region will be executed by the second weak pre-fetching command and the weak pre-fetching commands thereafter.

Usually, a program accesses plural locations within the same region, and, in this case, pre-fetching commands of a number corresponding to the number of access locations are generated at the compiler. Accordingly, even if the pre-fetching process is not executed by the first weak pre-fetching command, the pre-fetching process is executed by a subsequent weak pre-fetching command, and the pre-fetching process is executed at a high frequency.

The third reason is to prevent the occurrence of a process wait while searching the mTLB 540, at the point in time when it is known that the entry does not exist in the μTLB 530, by canceling the command and executing the next command.

As described above, the present embodiment is structured such that, when the weak pre-fetching command is executed, if the μTLB 530 is referred to and the required TLB entry does not exist, the mTLB 540 is referred to, and if the required TLB entry exists, it is transferred to the μTLB 530. Therefore, probability of success of software pre-fetching in accordance with the weak pre-fetching command is high.

According to the present invention, probability of success of pre-fetching is high the next time that a pre-fetching command is executed for the same region.

Moreover, generation of a process wait time is avoided.

Furthermore, unforeseen stoppage of a program due to optimization or the like of a compiler is prevented.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information processing apparatus comprising:
a cache memory formed from at least one hierarchy;
a first address-converting unit that converts a virtual address to a physical address, includes a first conversion table of the virtual addresses and the physical addresses, and is used first for address conversion;
a second address-converting unit that converts the virtual address not converted by the first address-converting unit, and that includes a second conversion table of the virtual addresses and the physical addresses; and
a cache controller that, when a pre-fetch command that speculatively transfers data or a command from a main storage to the cache memory is run, provides control to execute the pre-fetch command, wherein the execution includes using the first address-converting unit to convert the virtual address, cancelling the pre-fetch command and using the second address-converting unit to convert the virtual address if the first address-converting unit can not convert the virtual address, registering the virtual address and the physical address as a pair in the first address-converting unit if the second address-converting unit conversion succeeds, and ending the pre-fetch command.

2. The information processing apparatus according to claim 1, wherein the cache controller, accepts execution of a next command at a point in time when the virtual address cannot be converted using the first address-converting unit.

3. The information processing apparatus according to claim 1, wherein if the cache controller cannot convert the virtual address using either of the first address-converting unit and the second address-converting unit, the cache controller inhibits trap notification with respect to an operating system.

4. A method for software pre-fetch control in an information processing apparatus that includes a cache memory formed from at least one hierarchy, and runs a pre-fetch command that speculatively transfers data or a command from a main storage to the cache memory, the method comprising:
- a first converting including converting a virtual address to a physical address, using a first conversion table of the virtual addresses and the physical addresses;
- a second converting including converting the virtual address using a second conversion table of the virtual addresses and the physical addresses, if the virtual address can not be converted at the first converting;
- executing the pre-fetch command including performing the first converting, cancelling the pre-fetch command and performing the second converting if the first converting fails, registering the virtual address and the physical address as a pair if the virtual address can be converted by the second converting, and ending the pre-fetch command.

5. The method according to claim 4, wherein the executing accepts execution of a next pre-fetch command at a point in time when the pre-fetch command is cancelled.

6. The method according to claim 4, wherein the executing includes inhibiting trap notification with respect to an operating system, if the virtual address can not be converted at either of the first converting and the second converting.

* * * * *